(No Model.)

A. YOUNG.
CAR BRAKE.

No. 489,842. Patented Jan. 10, 1893.

Witnesses

Inventor
Abram Young
by
his Att'y.

UNITED STATES PATENT OFFICE.

ABRAM YOUNG, OF BINGHAMTON, NEW YORK.

CAR-BRAKE.

SPECIFICATION forming part of Letters Patent No. 489,842, dated January 10, 1893.

Application filed March 28, 1892. Renewed December 16, 1892. Serial No. 455,360. (No model.)

*To all whom it may concern:*

Be it known that I, ABRAM YOUNG, a citizen of the United States, residing at Binghamton, in the county of Broome and State of New York, have invented a certain new and useful Improvement in Automatic Car-Brakes, of which the following is a full, clear, and exact description.

The object of this invention is to construct a brake in which the brake-blocks or shoes are applied through the intervention of mechanism operated from the rotating car-axle.

The principle of the invention will be described first, and the best mode in which I have contemplated applying that principle will be stated next, and then the part, combination or improvement which I claim as my invention will be particularly pointed out and claimed.

Figure 1:
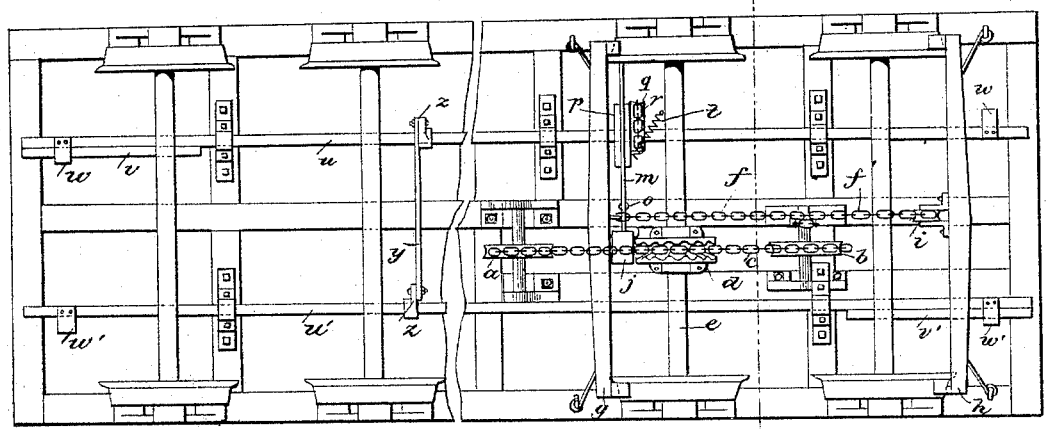
Figure 2:
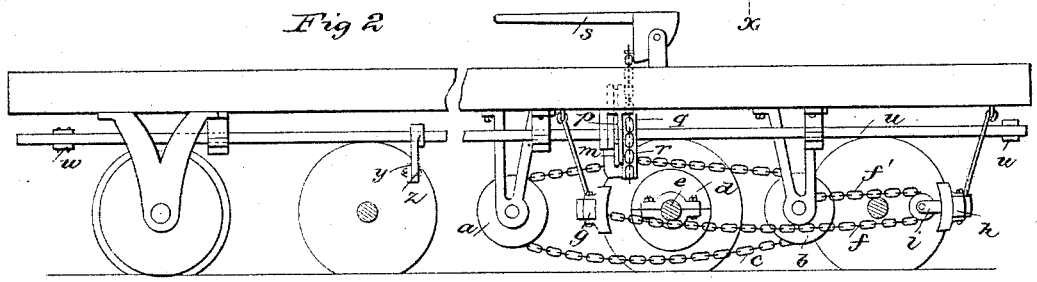
Figure 3:
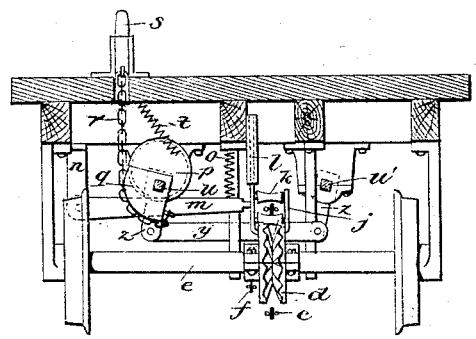
Figure 4:
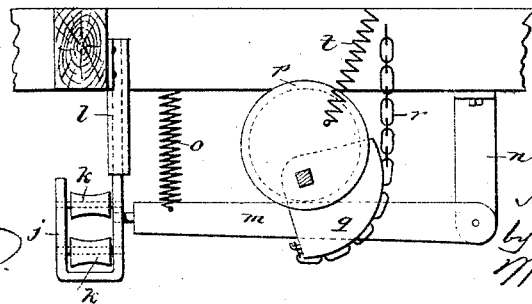

In the accompanying drawings illustrating my invention, in the several figures of which like parts are similarly designated, Figure 1 is a bottom plan. Fig. 2 a side elevation, with the near wheels of the right hand truck removed. Fig. 3 is a cross-section, taken in the plane of line $x$—$x$ of Fig. 1, and looking toward the left, and Fig. 4 is a detail, in elevation, of the actuator chain depressor.

This brake is designed primarily for freight train braking, but of course it is applicable to passenger trains.

The main and essential features are as follows: Pulleys $a$ and $b$ supporting an endless chain $c$, which I call the actuator chain; a friction wheel $d$ made in halves and clamped upon an axle $e$ of the car wheels in line with the chain $c$; the chain or chain and rod $f$ connecting the brake-beams $g$ and $h$ in usual manner, but having one end $f'$ fastened to the axle of the pulley $b$ so as to be wound about such axle as it is rotated, the said chain $f'$ first passing about a pulley $i$ on the brake-beam $h$, and a depressor for the actuator chain to cause it to engage the friction wheel and by the latter be pulled upon so as to rotate the chain and cause the pulley $b$ to rotate and wind up the brake-beam chain and apply the brakes, and to release such actuator chain from such friction wheel to permit the brakes to fall off or be released. These elements constitute the gist and principle of my invention, and the details hereinafter described are simply one means but not the only means I contemplate employing for carrying out the principle of my invention. And first I desire to premise that my invention is applicable to cars already built and does not involve any modifications of the trucks or framing, inasmuch as all the parts of my invention are applicable as attachments. The depressor, as here shown, consists of a vertically sliding bracket $j$ in which two pulleys or rollers $k$ are secured, and between these rollers the actuator chain is arranged. This bracket is arranged in a socket $l$ depending from the car framing. A lever $m$ is pivoted at one end to a bracket $n$ attached to the car framing, and its other end is loose-jointed to the bracket $j$ containing the actuator chain rollers. Any suitable means, actuated by any suitable motor mechanism, for raising and lowering the rollers $k$ and hence the actuator chain, may be employed. I have shown only one such mechanism, and the raising operation, to free the actuator chain from the friction wheel, is performed by a spring $o$, alone or assisted. The lowering operation to cause the actuator chain to be engaged by the friction wheel and thereby actuate the brake chain and put on the brakes, is effected by a cam $p$ suitably supported above the lever $m$ and having its face grooved so as to straddle said lever. This cam is connected with a weighted segment $q$ to which a chain $r$ is connected, and which chain extends and is secured to an operating lever $s$ located on the cars or the engineer's cab, or the tender, or in the caboose, for operation by the train hands. The cam is returned from the lever by the weighted segment $q$, and a spring $t$ may be employed to assist.

In order to operate from a single point, as the caboose, all the brakes throughout the train, I mount the cam $p$ upon a rod $u$ extending the length of the car, and I couple these rods from car to car by any suitable means, such, for example, as a sliding rod $v$ arranged in a yoke or socket $w$ and adapted to be fastened in a corresponding yoke or socket on the rod $u$ of the next adjacent car. And in order to provide for cars that may be turned end for end, I duplicate these rods and their sliding rods and sockets on each car, as at $u'$, $v'$, $w'$, and connect them by a bar $y$ and rocker arms $z$ so as to cause them to work together.

Inasmuch as the trucks and other parts of the car not of my invention may be of usual or other approved construction, I have represented them in a purely conventional manner.

I contemplate applying air, steam, or electricity to the operation of the actuator chain, and hence I do not limit my invention to the mechanical devices shown for that purpose.

What I claim is:—

1. An automatic car-brake comprising an endless actuator chain, supporting pulleys therefor, a friction wheel on the car-axle, a depressor for causing the said actuator chain to engage said friction wheel, and a chain connecting the brake-beams with the axle of one of said pulleys, so that when the actuator chain is engaged by the friction wheel the said pulley shaft will be rotated thereby winding up the brake-beams' chain and applying the brakes, substantially as described.

2. An automatic car-brake comprising an endless actuator chain, pulleys upon which it is supported, connections from one of said pulleys with the brake-beams, a friction wheel on one of the car-axles, a movable bracket engaging said actuator chain, and means to move said bracket to carry the chain into and out of engagement with the friction wheel, substantially as described.

3. An automatic car-brake comprising an endless actuator chain, pulleys upon which it is supported, connections from one of said pulleys with the brake-beams, a friction wheel on one of the car-axles, a movable bracket engaging said actuator chain, a lever connected to said bracket, and a cam, and means to move it against said lever to depress it and thereby move the bracket and put the actuator chain in engagement with the friction wheel, substantially as described.

4. An automatic car-brake comprising an endless actuator chain, pulleys upon which it is supported, connections from one of said pulleys with the brake-beams, a friction wheel on one of the car-axles, a movable bracket engaging said actuator chain, a lever connected to said bracket, a cam, a rod on which it is fixed, couplings for connecting the various rods throughout the train, and means arranged in the caboose or other part of the train for operating all of the cams and braking mechanisms throughout the train, substantially as described.

In testimony whereof I have hereunto set my hand this 25th day of March, A. D. 1892.

ABRAM YOUNG.

Witnesses:
EDWIN A. FINCKEL,
WM. H. FINCKEL.